US012039107B2

(12) United States Patent
Sato

(10) Patent No.: US 12,039,107 B2
(45) Date of Patent: Jul. 16, 2024

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM CORPORATION, Tokyo (JP)

(72) Inventor: Naoko Sato, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/055,359

(22) Filed: Nov. 14, 2022

(65) Prior Publication Data
US 2023/0195235 A1    Jun. 22, 2023

(30) Foreign Application Priority Data

Dec. 17, 2021    (JP) .................................. 2021-205156

(51) Int. Cl.
G06F 3/01    (2006.01)
(52) U.S. Cl.
CPC .................................. *G06F 3/017* (2013.01)
(58) Field of Classification Search
CPC .. G06F 3/017; G06F 3/04842; G06F 3/04817; G06F 3/0482
See application file for complete search history.

(56) References Cited

U.S. PATENT DOCUMENTS

| 2005/0124360 A1* | 6/2005 | Choi | H04M 1/72436 |
| | | | 455/466 |
| 2011/0242592 A1* | 10/2011 | Tamura | G06F 3/1259 |
| | | | 358/1.15 |
| 2016/0370950 A1* | 12/2016 | Han | G06F 3/0486 |
| 2018/0101297 A1* | 4/2018 | Yang | H04L 51/04 |
| 2021/0281529 A1* | 9/2021 | Baron | H04L 51/42 |
| 2023/0269304 A1* | 8/2023 | Huang | H04L 67/55 |
| | | | 709/206 |

FOREIGN PATENT DOCUMENTS

JP    2001-306227 A    11/2001

OTHER PUBLICATIONS

Balint Szabo et al., A Flexible Windows Workspace Saving and Restoring Utility, Sep. 1, 2019, IEEE Xplore, pp. 561-568 (Year: 2019).*
Tatsuo Matsuura et al., An Akashic Desktop Recorder for Resumption of Works, Jul. 1, 2016, International Congress on Advanced Applied Informatics, pp. 25-30 (Year: 2016).*

* cited by examiner

*Primary Examiner* — Tam T Tran
(74) *Attorney, Agent, or Firm* — SOLARIS Intellectual Property Group, PLLC

(57) ABSTRACT

An information processing apparatus includes a processor configured to display a message for notifying a user, store a storage object that is at least one of a screen displaying the message or the message in a storage unit, in a case where a first gesture operation is detected, and display the screen displaying the message or the message, in a case where a predetermined condition is satisfied after the display of the message is erased.

23 Claims, 10 Drawing Sheets

FIG. 3

PLEASE SELECT HOLE PUNCHING POSITION.

| TWO UPPER HOLES | THREE UPPER HOLES | FOUR UPPER HOLES |
| TWO LEFT HOLES | THREE LEFT HOLES | FOUR LEFT HOLES |

FIG. 4

「TWO UPPER HOLES」CANNOT BE APPLIED.
PLEASE CHECK TWO-SIDED PRINTING SETTING, PAGE NUMBER SETTING,
STAPLING POSITION SETTING,
AND HOLE PUNCHING POSITION SETTING.

| TWO UPPER HOLES | THREE UPPER HOLES | FOUR UPPER HOLES |
| TWO LEFT HOLES | THREE LEFT HOLES | FOUR LEFT HOLES |

FIG. 5

「TWO UPPER HOLES」 CANNOT BE APPLIED.
PLEASE CHECK TWO-SIDED PRINTING SETTING, PAGE NUMBER SETTING,
STAPLING POSITION SETTING,
AND HOLE PUNCHING POSITION SETTING.

FLICK OPERATION HAS BEEN DETECTED.

HOLES    HOLES    HOLES

FIG. 9

PRINT SETTINGS ARE AS FOLLOWS.

| | |
|---|---|
| COPIES | 1 |
| COLOR MODE | BLACK |
| TWO-SIDED | ONE SIDED |
| PAGES | 5 |
| STAPLE | ONE ON UPPER RIGHT |
| PUNCH HOLE | NONE |

26

[TWO UPPER HOLES]
CANNOT BE APPLIED.
PLEASE CHECK
TWO-SIDED PRINTING SETTING,
PAGE NUMBER SETTING,
STAPLING POSITION SETTING,
AND HOLE PUNCHING
POSITION SETTING.

26A

MAGENTA TONER SHORTAGE.  26A

CYAN TONER SHORTAGE.  26A

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2021-205156, filed on Dec. 17, 2021.

BACKGROUND

(i) Technical Field

The present invention relates to an information processing apparatus, a non-transitory computer readable medium storing an information processing program, and an information processing method.

(ii) Related Art

JP2001-306227A discloses a data input apparatus that outputs and processes data generated by an operation input of an operation unit, displays an error message on a display unit in a case where an error occurs, and then automatically erases the error message after a certain period of time has elapsed. This data input apparatus includes a storage unit that stores an error message displayed on the display unit in a case where an error occurs, and a redisplay control unit that redisplays the error message stored by the storage unit on the display unit, in response to an error redisplay operation of the operation unit.

SUMMARY

The display of the message for notifying the user disappears after a predetermined time has elapsed. However, there is a problem that once the display of the message disappears, the user cannot check the message again.

Aspects of non-limiting embodiments of the present disclosure relate to an information processing apparatus, a non-transitory computer readable medium storing an information processing program, and an information processing method that allow a user to recheck a message notified to the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to display a message for notifying a user, store a storage object that is at least one of a screen displaying the message or the message in a storage unit, in a case where a first gesture operation is detected, and display the screen displaying the message or the message, in a case where a predetermined condition is satisfied after the display of the message is erased.

BRIEF DESCRIPTION OF THE DRAWINGS

Exemplary embodiment(s) of the present invention will be described in detail based on the following figures, wherein:

FIG. 3 is a schematic diagram showing an example of an operation screen according to the exemplary embodiment;

FIG. 4 is a schematic diagram showing an example of a message display screen according to the exemplary embodiment;

FIG. 5 is a schematic diagram showing an example in a case where a detection message is displayed on the message display screen according to the exemplary embodiment;

FIG. 9 is a schematic diagram showing an example of a case where a plurality of the message display screens or notification messages according to the first exemplary embodiment are redisplayed;

DETAILED DESCRIPTION

First Exemplary Embodiment

Figure 1:
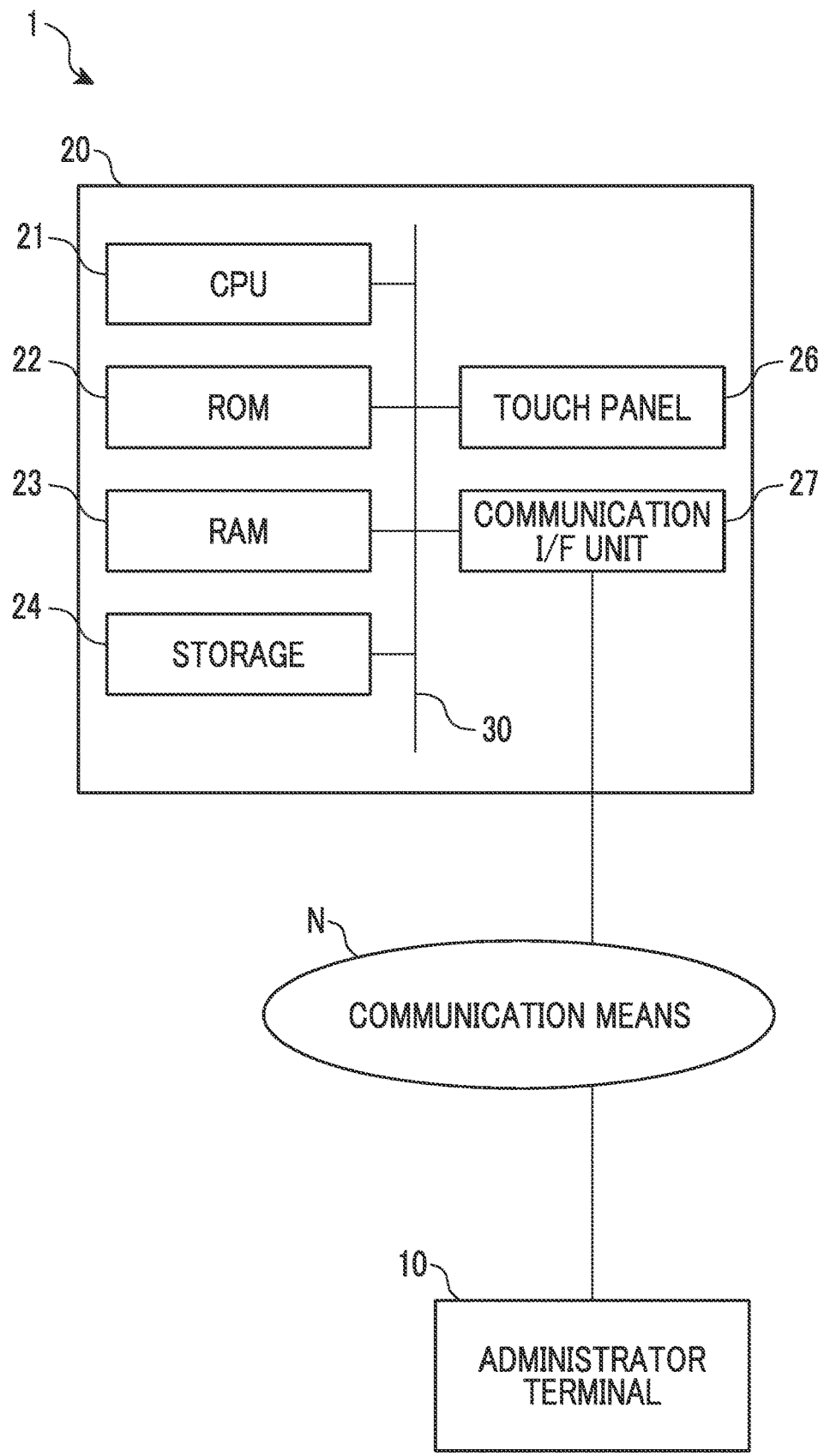
FIG. 1 is a schematic diagram illustrating an example of a hardware configuration of an information processing system according to an exemplary embodiment.

Hereinafter, exemplary embodiments of the technique of the present invention will be described with reference to the drawings. The identical reference numerals are given to the identical or equivalent components and parts in each drawing. In addition, the dimensional ratios in the drawings are exaggerated for convenience of explanation and may differ from the actual ratios.

As shown in FIG. 1, an information processing system 1 according to the present exemplary embodiment includes an administrator terminal 10 and an information processing apparatus 20. Note that the number of administrator terminals 10 is not limited to the example in FIG. 1.

The administrator terminal 10 and the information processing apparatus 20 can communicate with each other via a communication unit N. In the present exemplary embodiment, as the communication unit N, an intro-communication line such as a local area network (LAN) or a wide area network (WAN) is applied. However, as the communication unit N, a public communication line such as the Internet or a telephone line may be applied, or a combination of an intra-company communication line and a public communication line may be applied. Further, in the present exemplary embodiment, a wireless communication line is applied as the communication unit N. However, as the communication unit N, a wired communication line may be applied, or a combination of wired and wireless communication lines may be applied.

The administrator terminal 10 is an information processing terminal owned by an administrator of the information processing apparatus 20 (hereinafter simply referred to as "administrator"). In the present exemplary embodiment, a smart phone is applied as the administrator terminal 10. A personal computer, a tablet terminal, or the like may be applied as the administrator terminal 10.

The information processing apparatus 20 is an image forming apparatus that executes a print function, a copy function, and a scan function. Note that the functions executed by the information processing apparatus 20 are not limited to the functions described above. For example, a facsimile function or the like may be applied as a function executed by the information processing apparatus 20. Further, a personal computer or the like may be applied as the information processing apparatus 20.

As shown in FIG. 1, the information processing apparatus 20 includes respective components of a central processing unit (CPU) 21, a read only memory (ROM) 22, a random access memory (RAM) 23, a storage 24, a touch panel 26, and a communication interface (communication I/F) unit 27. Components are communicably connected to each other via a bus 30.

The CPU 21 is a central arithmetic processing unit and executes various programs or controls each unit. That is, the CPU 21 reads a program from the ROM 22 or the storage 24, and executes the program using the RAM 23 as a work area. The CPU 21 controls each of the above components and performs various arithmetic processes, according to the program recorded in the ROM 22 or the storage 24. In the present exemplary embodiment, the information processing program 200 is stored in the ROM 22 or the storage 24.

The ROM 22 stores various programs and various data. The RAM 23 temporarily stores a program or data as a work area. The storage 24 as a storage unit is configured by a hard disk drive (HDD) or a solid state drive (SSD), and stores various programs including an operating system and various data. In addition, the storage 24 stores a storage object which will be described later.

The touch panel 26 is a liquid crystal display that displays various types of information, and also functions as an input unit used for performing various inputs. The touch panel 26 detects gesture operations performed by the user from changes in capacitance.

The communication interface unit 27 is an interface for communicating with other devices, and uses standards such as Ethernet (registered trademark), FDDI, and Wi-Fi (registered trademark), for example.

Next, the action of the information processing apparatus 20 will be described.

Figure 2:
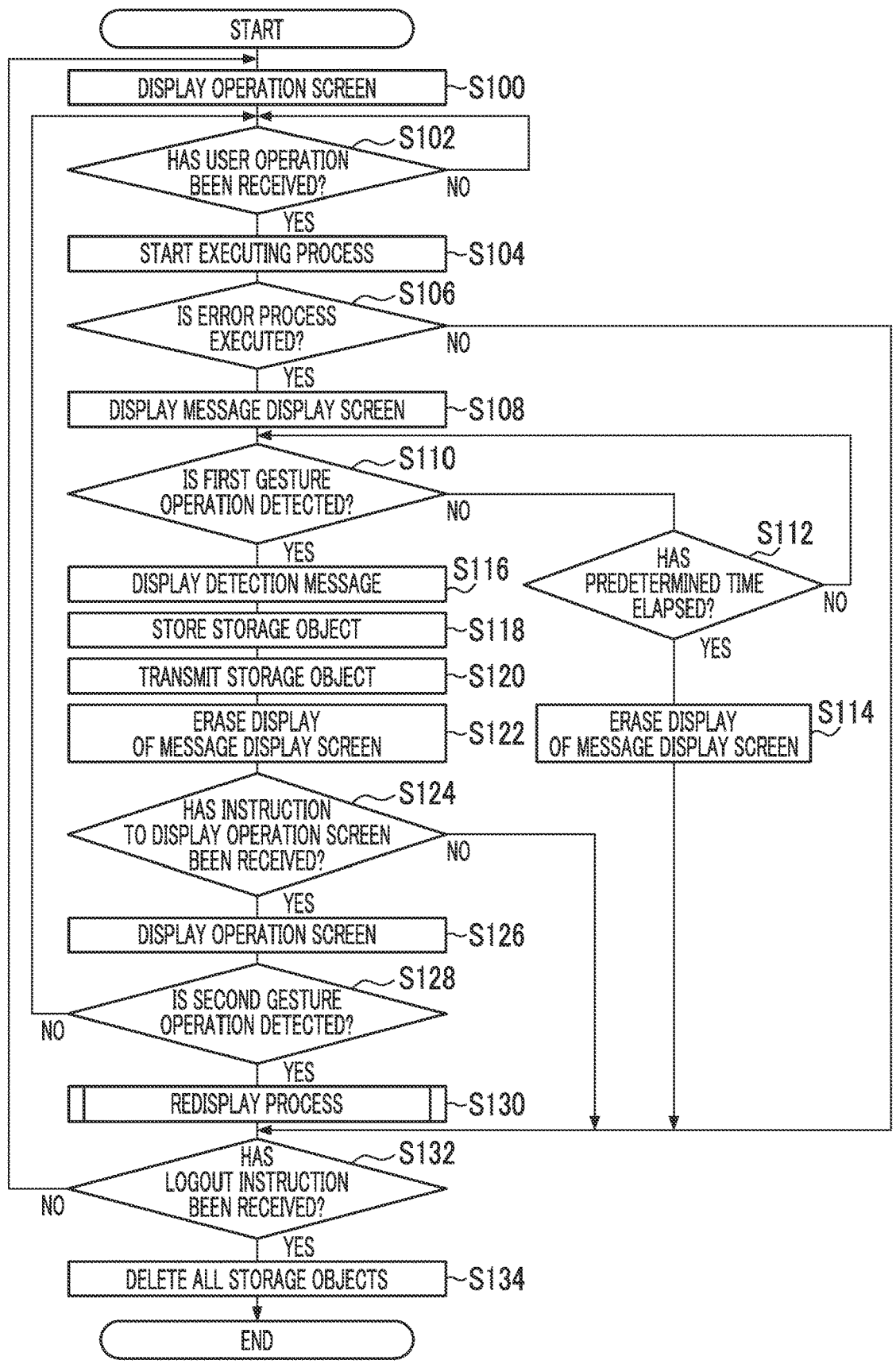
FIG. 2 is a flowchart showing an example of information processing according to the exemplary embodiment.

FIG. 2 is a flowchart showing the flow of an information process by the information processing apparatus 20. The Information process is performed by the CPU 21 reading out the information processing program 200 from the ROM 22 or the storage 24, developing the program in the RAM 23, and executing the program.

In step S100 of FIG. 2, the CPU 21 displays an operation screen according to a predetermined format, on the touch panel 26.

As shown in FIG. 3, a message prompting to select the setting of the hole punching position is displayed on the operation screen according to the present exemplary embodiment. It should be noted that the message displayed on the operation screen is not limited to the message prompting to select the setting of the hole punching position. For example, as the above message, any message prompting the user to operate the touch panel 26 such as a message prompting to select whether or not to copy on both sides and or a message prompting to select the orientation setting of the document set in the information processing apparatus 20 may be applied.

In step S102, the CPU 21 waits until receiving an operation from the user via the touch panel 26, on the operation screen. In a case of receiving an operation from the user via the touch panel 26 (step S102: YES), the CPU 21 proceeds to step S104.

In step S104, the CPU 21 starts executing the process related to the operation received from the user.

In step S106, the CPU 21 determines whether or not the process of which execution has been started has been stopped, that is, whether or not an error process has been executed. In a case where it is determined that the error process has been executed (step S106: YES), the CPU 21 proceeds to step S108. On the other hand, in a case where it is determined that the error process has not been executed (step S106: NO), the process proceeds to step S132.

In step S108, a message display screen according to a predetermined format, as a screen displaying a notification message that is a message for notifying the user is displayed on the touch panel 26.

As shown in FIG. 4, on the message display screen according to the present exemplary embodiment, a message indicating that the setting selected on the operation screen ("upper 2 holes" in the example shown in FIG. 4) cannot be applied is displayed as a notification message. Further, on the message display screen according to the present exemplary embodiment, a message prompting to check the settings (in the example shown in FIG. 4, two-sided printing setting, page number setting, stapling position setting, and hole punching position setting) is displayed as a notification message.

In the example shown in FIG. 4, as the message display screen, a screen in which a part of the operation screen, which is the screen displayed immediately before displaying the message display screen, is switched to a notification message is applied. However, it is not limited to this example. For example, as the message display screen, a screen in which the entire operation screen, which is a screen displayed immediately before displaying the message display screen, is switched to a notification message may be applied.

In step S110, the CPU 21 determines whether or not a first gesture operation has been detected via the touch panel 26. In a case where the first gesture operation has not been detected via the touch panel 26 (step S110: NO), the CPU 21 proceeds to step S112. In the present exemplary embodiment, a flick operation is applied as the first gesture operation. However, it is not limited to this example. For example, a swipe operation, a pinch out operation, or the like may be applied as the first gesture operation. In addition, in the present exemplary embodiment, as the first gesture operation, a gesture operation that is used only for storing a storage object, which will be described later, in the storage 24 is applied. However, it is not limited to this example. For example, the identical gesture operations as other gesture operations may be applied as the first gesture operation.

In step S112, the CPU 21 determines whether or not a predetermined time (for example, 5 seconds) has elapsed since the message display screen was displayed on the touch panel 26. In a case where it is determined that a predetermined time has elapsed since the message display screen was displayed on the touch panel 26 (step S112: YES), the CPU 21 proceeds to step S114. On the other hand, in a case where the CPU 21 determines that the predetermined time has not elapsed since the message display screen was displayed on the touch panel 26 (step S112: NO), the process returns to step S110.

In step S114, the CPU 21 erases the display of the message display screen from the touch panel 26.

On the other hand, in a case where the first gesture operation is detected via the touch panel 26 (step S110: YES), the CPU 21 proceeds to step S116. In step S116, the CPU 21 displays a detection message indicating that the first gesture operation has been detected on the message display screen.

As shown in FIG. 5, on the message display screen according to the present exemplary embodiment, in addition to the message shown in FIG. 4, a message indicating that a flick operation as the first gesture operation has been detected is displayed as a detection message.

In step S118, the CPU 21 stores, in the storage 24, the storage object, which is at least one of the message display screen or the notification message. It should be noted that the CPU 21 presets an object to be stored in the storage 24 as the storage object, among the message display screen and the notification message, before detecting the first gesture operation. However, it is not limited to this example. For example, the CPU 21 may receive an object to be stored in the storage 24 as the storage object, from the user, in a case where the first gesture operation is detected.

In step S120, the CPU 21 transmits the storage object to the administrator terminal 10 as a predetermined transmission destination. In step S120, the CPU 21 may transmit the storage object to a terminal other than the administrator terminal 10, such as a terminal owned by the user.

In step S122, the CPU 21 erases the display of the message display screen from the touch panel 26, thereby erasing the display of the notification message. In addition, in a case where the message display screen is displayed over the operation screen in step S108, the CPU 21 may not erase the operation screen from the touch panel 26 even in a case where the message display screen is erased in step S122.

In step S124, CPU 21 determines whether an instruction to display the operation screen, which is the screen displayed immediately before displaying the notification message, has been received via the touch panel 26. In a case where an instruction to display the operation screen has been received via the touch panel 26 (step S124: YES), the CPU 21 proceeds to step S126. On the other hand, in a case where an instruction to display the operation screen has not been received via the touch panel 26 (step S124: NO), the CPU 21 proceeds to step S132.

In step S126, the operation screen is displayed on the touch panel 26.

Note that in a case where the display of the operation screen was not erased from the touch panel 26 in step S122, the processes of steps S124 and S126 may not be executed.

In step S128, the CPU 21 determines whether or not the second gesture operation has been detected via the touch panel 26. In a case where the second gesture operation is detected via the touch panel 26 (step S128: YES), the CPU 21 proceeds to step S130. On the other hand, in a case where the CPU 21 does not detect the second gesture operation via the touch panel 26 (step S128: NO), the process returns to step S102. Note that, in the present exemplary embodiment, a gesture operation different from the first gesture operation is applied as a second gesture operation. However, it is not limited to this example. For example, a predetermined gesture operation (for example, a swipe operation, a pinch-out operation, or the identical flick operation to the first gesture operation) may be applied as the second gesture operation.

In step S130, the CPU 21 executes a redisplay process. Details of the redisplay process will be described later with reference to FIG. 6.

In step S132, the CPU 21 determines whether or not a logout instruction, which is an instruction to end the use of the information processing apparatus 20, has been received. In a case where the logout instruction has been received (step S132: YES), the CPU 21 proceeds to step S134. On the other hand, in a case where the logout instruction has not been received (step S132: NO), the CPU 21 returns to step S100.

In step S134, the CPU 21 deletes all the storage objects stored in the storage 24, and ends the present information processing.

Next, the flow of a redisplay process by the information processing apparatus 20 will be described with reference to FIG. 6.

Figure 6:
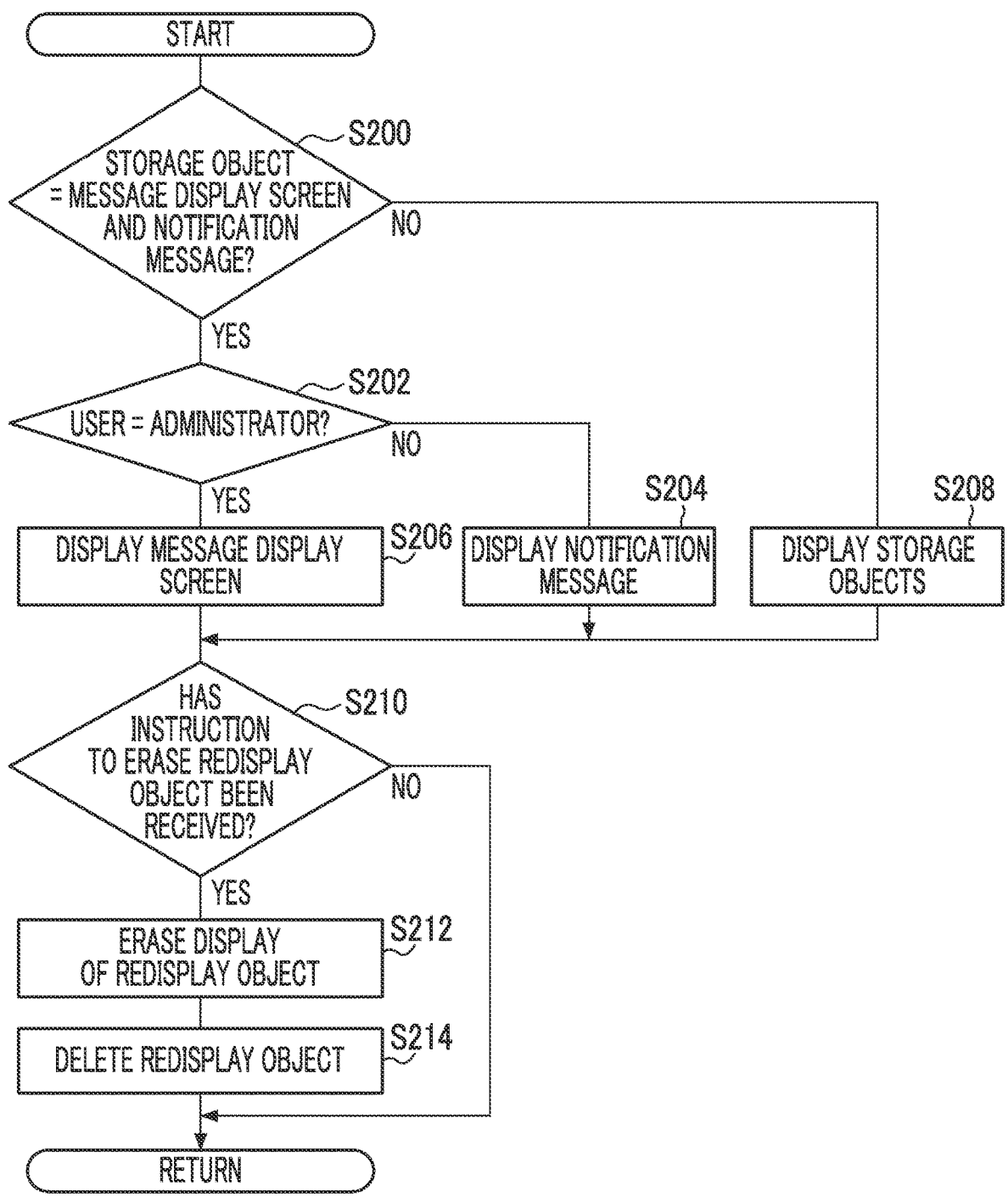
FIG. 6 is a flowchart showing an example of a redisplay process according to the first exemplary embodiment.

In step S200 of FIG. 6, the CPU 21 determines whether or not the message display screen and the notification message have been stored in the storage 24, as storage objects. In a case where it is determined that the message display screen and the notification message are stored in the storage 24, as the storage objects (step S200: YES), the CPU 21 proceeds to step S202. On the other hand, in a case where it is determined that the message display screen or the notification message is not stored in the storage 24, as the storage objects (step S200: NO), the CPU 21 proceeds to step S208.

In addition, in step S200, the CPU 21 may end the present redisplay process, in a case where the storage object is not stored in the storage 24. Then, the CPU 21 may proceed to step S132 in the information processing.

In step S202, the CPU 21 determines whether the user is an administrator. Specifically, the CPU 21 receives a user Identifier (ID) for specifying a user, and determines whether or not the user is an administrator, based on the received user ID. Alternatively, the CPU 21 may determine whether or not the user is the administrator, according to whether or not an instruction to execute the function of the information processing apparatus 20 has been received from the administrator terminal 10. In this case, the CPU 21 determines that the user is the administrator in a case where an instruction to execute the function of the information processing apparatus 20 is received from the administrator terminal 10, and determines that the user is not the administrator in a case where an instruction to execute the function of the information processing apparatus 20 is received from other than the administrator terminal 10. In a case where it is determined that the user is the administrator (step S202: YES), the CPU 21 proceeds to step S206. On the other hand, in a case where it is determined that the user is not the administrator (step S202: NO), the CPU 21 proceeds to step S204.

Figure 7:
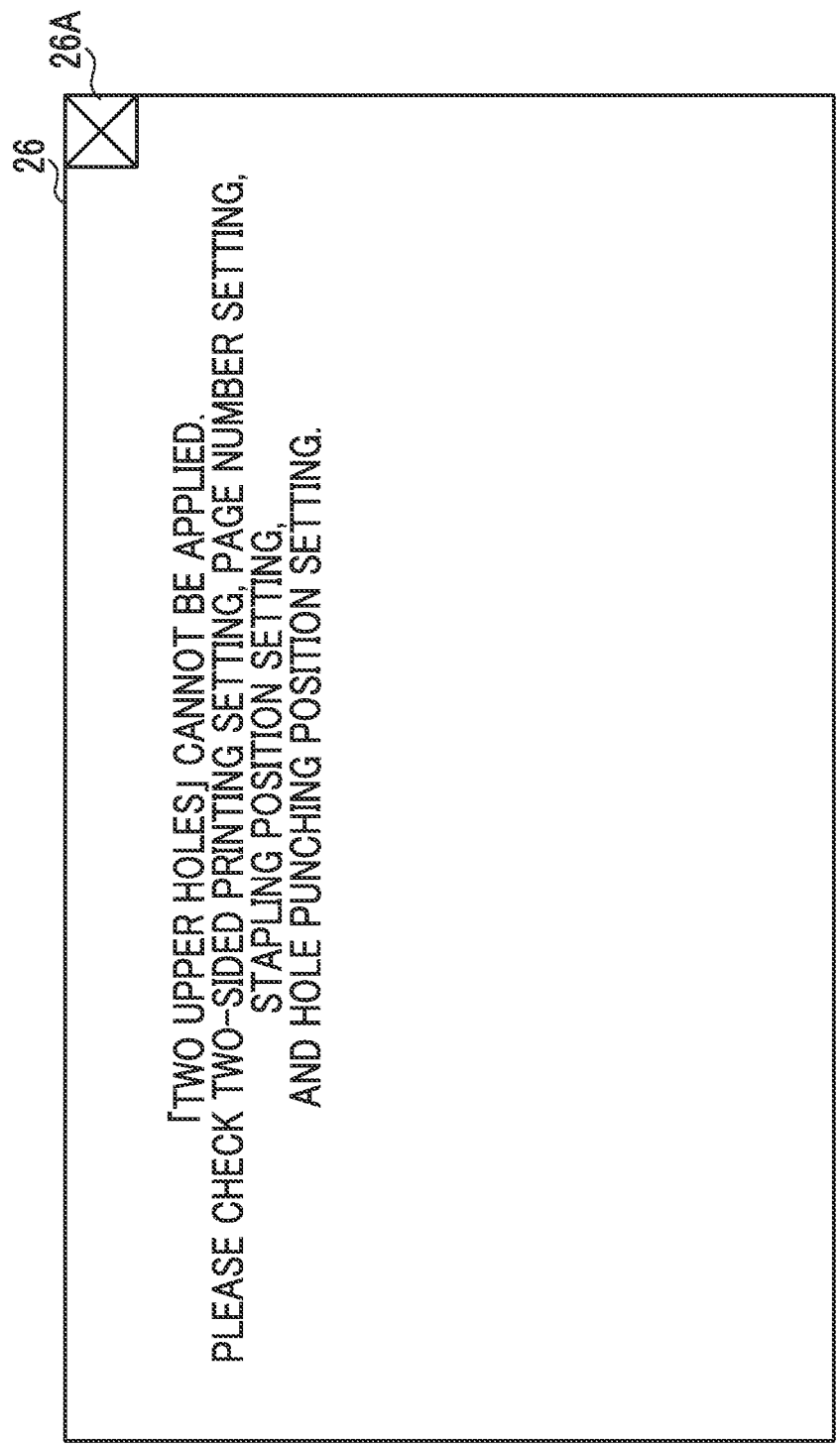
FIG. 7 is a schematic diagram showing an example of a case where a notification message according to the first exemplary embodiment is redisplayed.

In step S204, the CPU 21 displays the notification message at the identical position to the position where the notification message is displayed in step S108 of FIG. 2. As shown in FIG. 7, the notification message is displayed at the identical position where the notification message is displayed. An erase button 26A for erasing the display of the notification message is also displayed. Note that the CPU 21 may display a notification message on a predetermined area of the touch panel 26.

Figure 8:
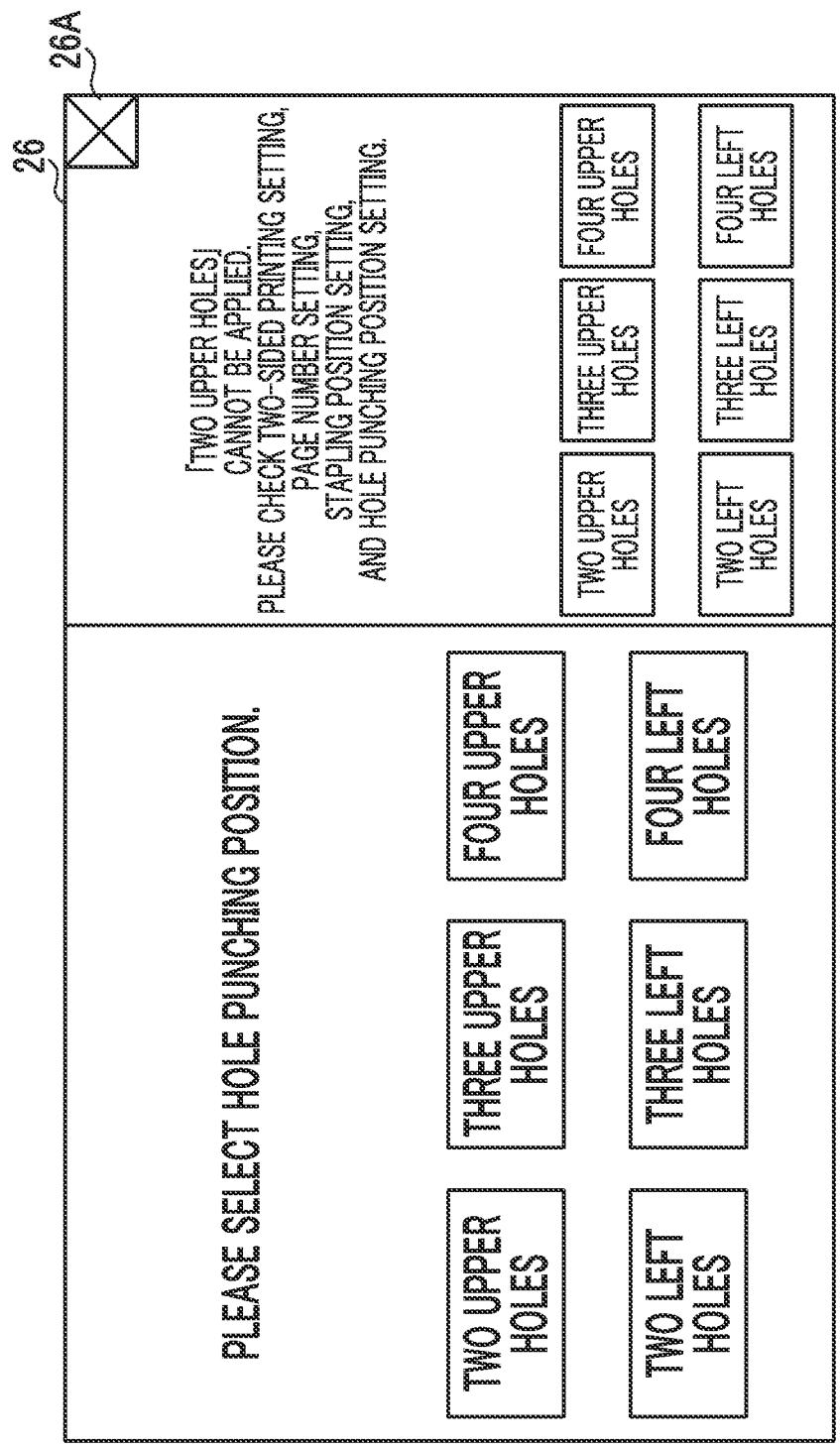
FIG. 8 is a schematic diagram showing an example of a case where the message display screen according to the first exemplary embodiment is redisplayed.

In step S206, the CPU 21 displays a message display screen on a predetermined area of the touch panel 26. In the present exemplary embodiment, the area on the right side of the touch panel 26 is applied as the predetermined area. As shown in FIG. 8, an operation screen, which is the screen displayed immediately before displaying the notification message, is displayed on the left side of the touch panel 26, and a message display screen is displayed on the right side of the touch panel 26. An erase button 26A for erasing the display of the message display screen is also displayed. Any area such as the area on the left side of the touch panel 26 may be applied as the predetermined area. Further, in a case where the storage 24 stores a plurality of storage objects, the CPU 21 may display the plurality of storage objects by receiving a scroll operation.

In a case where it is determined that the user is the administrator (step S202: YES), the CPU 21 may proceed to step S204, and in a case where it is determined that the user is not the administrator (step S202: NO), the CPU 21 may proceed to step S206. In other words, the CPU 21 may display the notification message in a case of determining that the user is the administrator, and may display the message display screen in a case of determining that the user is not the administrator.

In step S208, the CPU 21 displays the message display screen or the notification message, which are the storage objects, on a predetermined area of the touch panel 26. The CPU 21 also displays an erase button 26A for erasing the display of the message display screen or the notification message. Note that the CPU 21 may display the message display screen or the notification message, which is a storage object, at the identical position to the position where the notification message is displayed.

Below, the message display screen or the notification message displayed by the CPU 21 in step S204, step S206, or step S208 is referred to as a redisplay object.

In step S210, the CPU 21 determines whether or not an instruction to erase the display of the redisplay object has been received. In other words, the CPU 21 determines whether or not selection of the erase button 26A has been received via the touch panel 26. In a case where an instruction to erase the display of the redisplay object has been received (step S210: YES), the CPU 21 proceeds to step S212. On the other hand, in a case where an instruction to erase the display of the redisplay object has not been received (step S210: NO), the CPU 21 ends the present redisplay process, and proceeds to step S132 in the information processing.

In step S212, the CPU 21 erases the display of the redisplay object.

In step S214, the CPU 21 deletes the redisplay object from the storage 24, and ends the present redisplay process. Then, the CPU 21 proceeds to step S132 in the information processing.

In the present exemplary embodiment, in a case where the identical screen to the screen displayed immediately before displaying the notification message is displayed, the CPU 21 displays the redisplay object. Further, the CPU 21 displays a single redisplay object. However, it is not limited to this example. For example, as shown in FIG. 9, the CPU 21 may display, on the touch panel 26, a screen other than the screen displayed immediately before displaying the notification message (in the example shown in FIG. 9, a screen displaying print settings), and a plurality of message display screens, or a notification message. In this case, the CPU 21 stores a plurality of storage objects in the storage 24. Further, the CPU 21 may simultaneously display a plurality of message display screens or notification messages.

Further, in the present exemplary embodiment, the CPU 21 determines which of the message display screen and the notification message is to be displayed, depending on whether the user is an administrator. However, it is not limited to this example. The CPU 21 may determine which of the message display screen and the notification message is to be displayed, depending on the user title. For example, the CPU 21 may display a message display screen in a case where the user manages the work of another user, and may display a notification message in a case where the user does not manage the work of the other user. Further, the CPU 21 may determine in advance which of the message display screen and the notification message is to be displayed, without depending on the attributes of the user.

Second Exemplary Embodiment

In the first exemplary embodiment, the CPU 21 determines which of the message display screen and the notification message is to be displayed, depending on the attributes of the user. In the second exemplary embodiment, the CPU 21 displays a notification message in a case of detecting the second gesture operation, and displays a message display screen in a case of detecting the second gesture operation after detecting the second gesture operation. Differences from the first exemplary embodiment will be described below. Since the hardware configuration is the same as in the first exemplary embodiment, the description is omitted. Further, since the flow of information processing is the same as in the first exemplary embodiment, the explanation is omitted.

Figure 10:
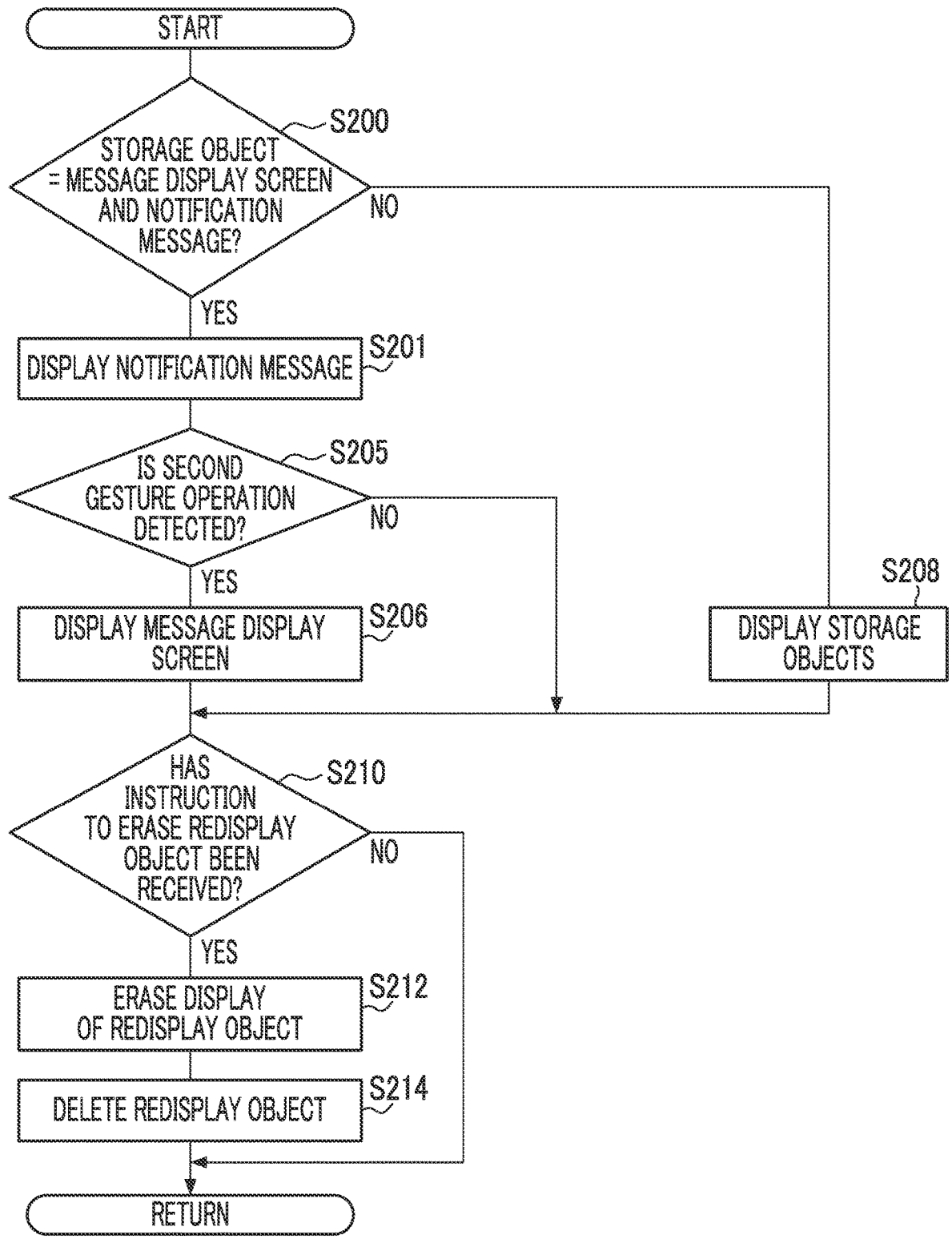
FIG. 10 is a flowchart showing an example of a redisplay process according to a second exemplary embodiment.

FIG. 10 shows a flowchart showing the flow of a redisplay process by the information processing apparatus 20 according to the present exemplary embodiment. Note that the identical step numbers to the step numbers in FIG. 6 are assigned to steps that execute the identical processes to the processes in the flow of the redisplay process shown in FIG. 6, and description thereof will be omitted.

In the flow of the redisplay process shown in FIG. 10, the processes of steps S201 and S205 are applied instead of the processes of steps S202 and S204 in the redisplay process shown in FIG. 6.

In step S201 of FIG. 10, the CPU 21 executes the identical process to step S204 of FIG. 6. Specifically, the CPU 21 displays the notification screen, in a case where the second gesture operation is detected (step S128 in FIG. 2: YES) and the message display screen and the notification message are stored in the storage 24 as the storage objects (step S200: YES).

In step S205, the CPU 21 executes the identical process to step S128 of FIG. 2. Specifically, in a case where the message display screen and the notification message are stored in the storage 24 as the storage objects (step S200: YES) and the second gesture operation is detected via the touch panel 26 (step S128 in FIG. 2: YES), the CPU 21 then determines whether or not the second gesture operation has been detected via the touch panel. In a case where the second gesture operation is detected after detecting the second gesture operation via the touch panel 26 (step S205: YES), the CPU 21 proceeds to step S206 and displays the message display screen. On the other hand, in a case where the second gesture operation has not been detected after detecting the second gesture operation via the touch panel 26 (step S205: NO), the CPU 21 proceeds to step S210.

In addition, CPU 21 may display a message display screen in step S201, and may display a notification message in step S206. In other words, the CPU 21 may display the message display screen, in a case where the second gesture operation is detected and the message display screen and the notification message are stored in the storage 24 as the storage objects. Then, in a case where the message display screen and the notification message are stored in the storage 24 as the storage objects, the second gesture operation is detected via the touch panel 26, and then the second gesture operation is detected via the touch panel, the CPU 21 may display the notification message.

Third Exemplary Embodiment

In the first exemplary embodiment, the CPU 21 determines which of the message display screen and the notification message is to be displayed, depending on the attributes of the user. In the third exemplary embodiment, the CPU 21 determines which of the message display screen or the notification message is to be displayed, depending on the content of the second gesture operation. Differences from the first exemplary embodiment will be described below. Since the hardware configuration is the same as in the first exemplary embodiment, the description is omitted. Further, since the flow of information processing is the same as in the first exemplary embodiment, the explanation is omitted.

Figure 11:
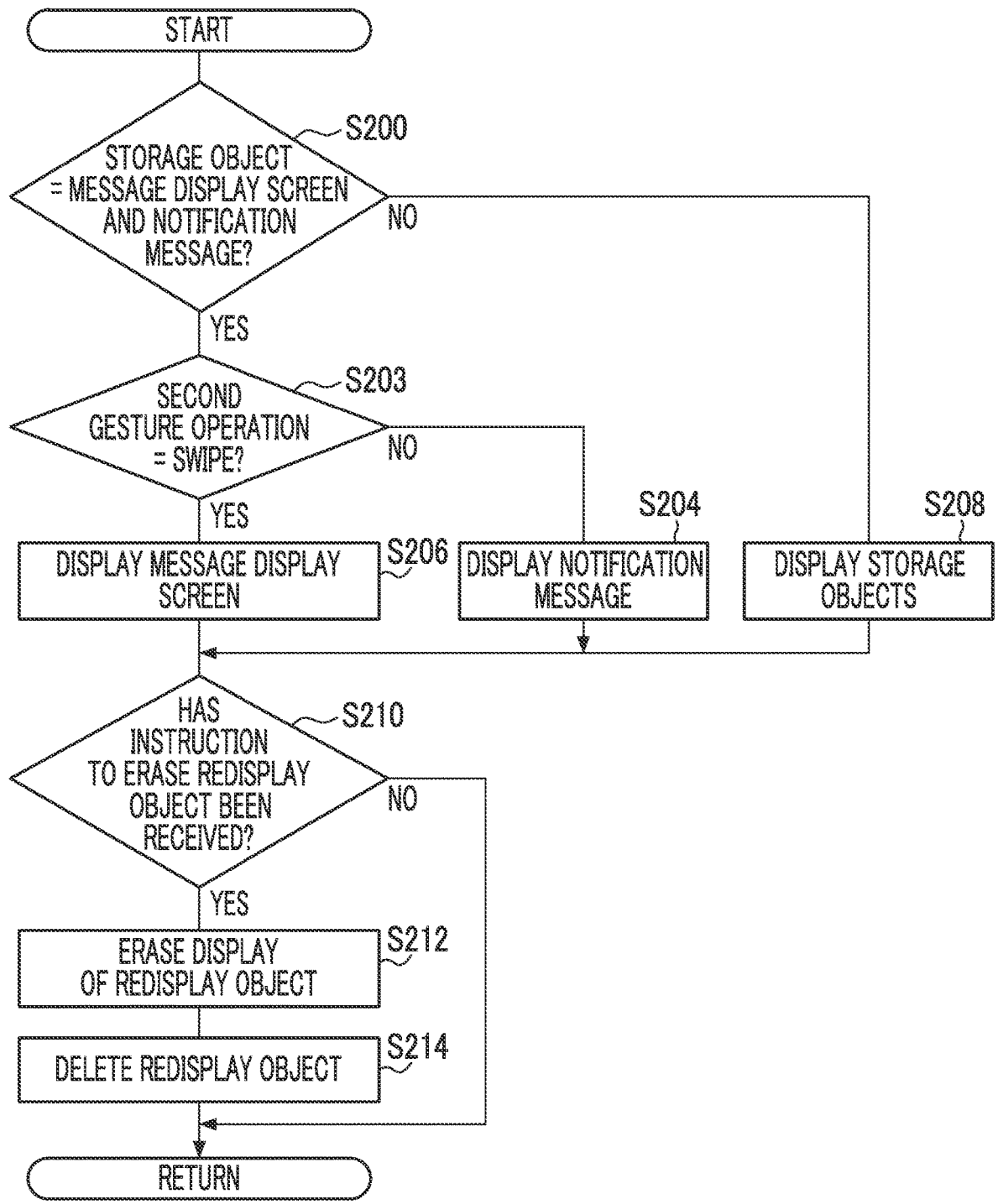
FIG. 11 is a flowchart showing an example of a redisplay process according to a third exemplary embodiment.

FIG. 11 shows a flowchart showing the flow of the redisplay process by the information processing apparatus 20 according to the present exemplary embodiment. Note that the identical step numbers to the step numbers in FIG. 6 are assigned to steps that execute the identical processes to the processes in the flow of the redisplay process shown in FIG. 6, and description thereof will be omitted.

In the flow of the redisplay process shown in FIG. 11, the process of step S203 is applied instead of the process of step S202 in the redisplay process shown in FIG. 6.

In step S203 of FIG. 11, the CPU 21 determines whether or not the detected second gesture operation is a swipe operation. Specifically, it is determined whether or not the second gesture operation detected in the process of step S128 in FIG. 2 is a swipe operation. In a case where the detected second gesture operation is a swipe operation (step S203: YES), the CPU 21 proceeds to step S206. On the other hand, in a case where the detected second gesture operation is not the swipe operation (step S203: NO), the CPU 21 proceeds to step S204. Note that the second gesture operation determined by the CPU 21 in step S203 is not limited to the swipe operation. For example, in step S203, the CPU 21 may determine whether or not the second gesture operation is a pinch-out operation, or may determine whether or not the second gesture operation is the identical flick operation to the first gesture operation.

Although the exemplary embodiments have been described above, the technical scope of the present invention is not limited to the scope described in the above exemplary embodiments. Various modifications and improvements can be added to the exemplary embodiments without departing from the scope of the present invention, and the exemplary embodiments to which the modifications or improvements are added are also included in the technical scope of the present invention.

In addition, the above exemplary embodiments do not limit the claimed invention, and not all combinations of features described in the exemplary embodiments are necessary for the solution of the invention. Inventions at various stages are included in the above-described exemplary embodiments, and various inventions can be extracted by combining a plurality of disclosed constituent elements. Even in a case where some constituent elements are deleted from all the constituent elements shown in the exemplary embodiments, as long as an effect is obtained, a configuration in which the some constituent elements are deleted can be extracted as an invention.

For example, in each of the exemplary embodiments described above, the CPU 21 detects a gesture operation from a change in capacitance detected by the touch panel 26. However, it is not limited to this example. For example, a gesture operation may be detected via a camera included in the information processing apparatus 20. In this case, the information processing apparatus 20 may be provided with a display unit such as a liquid crystal display which does not function as an input unit for inputting various types of information, instead of the touch panel 26.

Further, in each of the above-described exemplary embodiments, the CPU 21 displays a notification message as an error message in a case where executing an error process. However, it is not limited to this example. The CPU 21 may display a notification message in any case as long as a message for notifying the user, such as a message prompting replacement of the toner cartridge or replenishment of paper is displayed.

Further, in each of the above exemplary embodiments, the CPU 21 displays the redisplay object in a case of detecting the second gesture operation. However, it is not limited to this example. For example, after erasing the display of the message display screen from the touch panel 26, the CPU 21 may display the redisplay object after a predetermined time (for example, 3 minutes) has elapsed. Alternatively, the CPU 21 may display the redisplay object, in a case where a condition determined according to the content of the notification message is satisfied. For example, in a case where the notification message prompts the user to operate the information processing apparatus 20, the CPU 21 may display the redisplay object in a case of detecting the second gesture operation. In a case where the notification message does not prompt the user to operate the information processing apparatus 20, the CPU 21 may erase the display of the message display screen from the touch panel 26, and then, after a predetermined time elapses, may display the redisplay object.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the present exemplary embodiment, the mode in which the information processing program 200 is installed in the ROM 22 or the storage 24 has been described, but the present invention is not limited to this. The information processing program 200 according to the present exemplary embodiment may be provided in a form recorded on a computer-readable storage medium. For example, the information processing program 200 according to the present exemplary embodiment may be provided in a form recorded in an optical disc such as a compact disc (CD)-ROM and a digital versatile disc (DVD)-ROM, or in a form recorded in a semiconductor memory such as a universal serial bus (USB) memory and a memory card. Further, the information processing program 200 according to the present exemplary embodiment may be acquired from an external apparatus via the communication interface unit 27.

Further, in the above-described exemplary embodiments, a case has been described in which information processing is implemented by a software configuration using a computer by executing a program, but the present invention is not limited to this. For example, information processing may be implemented by a hardware configuration or a combination of a hardware configuration and a software configuration.

In addition, the configuration of the information processing apparatus 20 described in the above exemplary embodiments is merely an example, and unnecessary portions may be deleted or new portions may be added without departing from the gist of the present invention.

Further, the processing flows of the information processing program 200 described in the above exemplary embodiments (see FIGS. 2, 6, 10, and 11) are also examples, and unnecessary steps may be deleted, new steps may be added, or the processing order may be changed, within the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to:
    display a message for notifying a user;
    store a storage object that is at least one of a screen displaying the message or the message in a storage unit, in a case where a first gesture operation is detected;
    display the screen displaying the message or the message, in a case where a predetermined condition is satisfied after the display of the message is erased; and
    determine which of the screen displaying the message or the message is to be displayed, depending on attributes of the user, in a case where the screen displaying the message and the message are stored in the storage unit, as the storage object.

2. The information processing apparatus according to claim 1,
    wherein the first gesture operation is a gesture operation used only for storing the storage object in the storage unit.

3. The information processing apparatus according to claim 1, wherein the processor is configured to:
    display a message indicating that the first gesture operation is detected, in a case where the first gesture operation is detected.

4. The information processing apparatus according to claim 1, wherein the processor is configured to:
    preset an object to be stored in the storage unit as the storage object, among the screen displaying the message and the message, before detecting the first gesture operation.

5. The information processing apparatus according to claim 1, wherein the processor is configured to:
    erase the display of the message, in a case where the storage object is stored in the storage unit.

6. The information processing apparatus according to claim 1, wherein the processor is configured to:
    display the screen displaying the message or the message, in a case where a second gesture operation is detected after the display of the message is erased.

7. The information processing apparatus according to claim 1, wherein the processor is configured to:
    display the screen displaying the message in a case where the user is an administrator of the information processing apparatus, and display the message in a case where the user is not the administrator of the information processing apparatus.

8. The information processing apparatus according to claim 1, wherein the processor is configured to:
    display the screen displaying the message or the message, in a case where an identical screen to a screen displayed immediately before displaying the message is displayed, after the display of the message is erased.

9. The information processing apparatus according to claim 1, wherein the processor is configured to:
    store a plurality of the storage objects in the storage unit; and
    display a plurality of the screens displaying the message, or the message.

10. The information processing apparatus according to claim 9, wherein the processor is configured to:
    display the plurality of screens displaying the message, or the message simultaneously.

11. The information processing apparatus according to claim 1, wherein the processor is configured to:
    delete the screen displaying the message or the message of which display is erased, from the storage unit, in a case where the display of the screen displaying the message or the message is erased.

12. The information processing apparatus according to claim 1, wherein the processor is configured to:
    delete all the storage objects stored in the storage unit, in a case where an instruction to end use of the information processing apparatus has been received.

13. The information processing apparatus according to claim 1, wherein the processor is configured to:
    transmit the storage object stored in the storage unit to a predetermined transmission destination.

14. The information processing apparatus according to claim 1, wherein the processor is configured to:
    display the screen displaying the message or the message at an identical position to a position where the message is displayed.

15. The information processing apparatus according to claim 1, wherein the processor is configured to:
    display the screen displaying the message or the message, in a predetermined area.

16. An information processing apparatus comprising:
    a processor configured to:
    display a message for notifying a user;
    store a storage object that is at least one of a screen displaying the message or the message in a storage unit, in a case where a first gesture operation is detected;
    display the screen displaying the message or the message, in a case where a predetermined condition is satisfied after the display of the message is erased; and
    in a case where the screen displaying the message and the message are stored in the storage unit, as the storage object, display the message in a case where the second gesture operation is detected after the display of the message is erased, and display the screen displaying the message in a case where the second gesture operation is detected after the second gesture operation is detected.

17. An information processing apparatus comprising:
a processor configured to:
display a message for notifying a user;
store a storage object that is at least one of a screen displaying the message or the message in a storage unit, in a case where a first gesture operation is detected;
display the screen displaying the message or the message, in a case where a predetermined condition is satisfied after the display of the message is erased; and
determine which of the screen displaying the message or the message is to be displayed, depending on contents of the second gesture operation, in a case where the screen displaying the message and the message are stored in the storage unit, as the storage object.

18. A non-transitory computer readable medium storing a program causing a computer to execute a process comprising:
displaying a message for notifying a user;
storing a storage object that is at least one of a screen displaying the message or the message in a storage unit, in a case where a first gesture operation is detected;
displaying the screen displaying the message or the message, in a case where a predetermined condition is satisfied after the display of the message is erased; and
determining which of the screen displaying the message or the message is to be displayed, depending on attributes of the user, in a case where the screen displaying the message and the message are stored in the storage unit, as the storage object.

19. An information processing method comprising:
displaying a message for notifying a user;
storing a storage object that is at least one of a screen displaying the message or the message in a storage unit, in a case where a first gesture operation is detected;
displaying the screen displaying the message or the message, in a case where a predetermined condition is satisfied after the display of the message is erased; and
determining which of the screen displaying the message or the message is to be displayed, depending on attributes of the user, in a case where the screen displaying the message and the message are stored in the storage unit, as the storage object.

20. A non-transitory computer readable medium storing a program causing a computer to execute a process comprising:
displaying a message for notifying a user;
storing a storage object that is at least one of a screen displaying the message or the message in a storage unit, in a case where a first gesture operation is detected;
displaying the screen displaying the message or the message, in a case where a predetermined condition is satisfied after the display of the message is erased; and
in a case where the screen displaying the message and the message are stored in the storage unit, as the storage object, displaying the message in a case where the second gesture operation is detected after the display of the message is erased, and displaying the screen displaying the message in a case where the second gesture operation is detected after the second gesture operation is detected.

21. A non-transitory computer readable medium storing a program causing a computer to execute a process comprising:
displaying a message for notifying a user;
storing a storage object that is at least one of a screen displaying the message or the message in a storage unit, in a case where a first gesture operation is detected;
displaying the screen displaying the message or the message, in a case where a predetermined condition is satisfied after the display of the message is erased; and
determining which of the screen displaying the message or the message is to be displayed as the storage object, depending on contents of the second gesture operation, in a case where the screen displaying the message and the message are stored in the storage unit.

22. An information processing method comprising:
displaying a message for notifying a user;
storing a storage object that is at least one of a screen displaying the message or the message in a storage unit, in a case where a first gesture operation is detected;
displaying the screen displaying the message or the message, in a case where a predetermined condition is satisfied after the display of the message is erased; and
in a case where the screen displaying the message and the message are stored in the storage unit, as the storage object, displaying the message in a case where the second gesture operation is detected after the display of the message is erased, and displaying the screen displaying the message in a case where the second gesture operation is detected after the second gesture operation is detected.

23. An information processing method comprising:
displaying a message for notifying a user;
storing a storage object that is at least one of a screen displaying the message or the message in a storage unit, in a case where a first gesture operation is detected;
displaying the screen displaying the message or the message, in a case where a predetermined condition is satisfied after the display of the message is erased; and
determining which of the screen displaying the message or the message is to be displayed as the storage object, depending on contents of the second gesture operation, in a case where the screen displaying the message and the message are stored in the storage unit.

* * * * *